April 2, 1935.  M. SCHWARTZ  1,996,592
FLASH LIGHT AND SHUTTER OPERATING DEVICE FOR CAMERAS
Filed Aug. 30, 1932
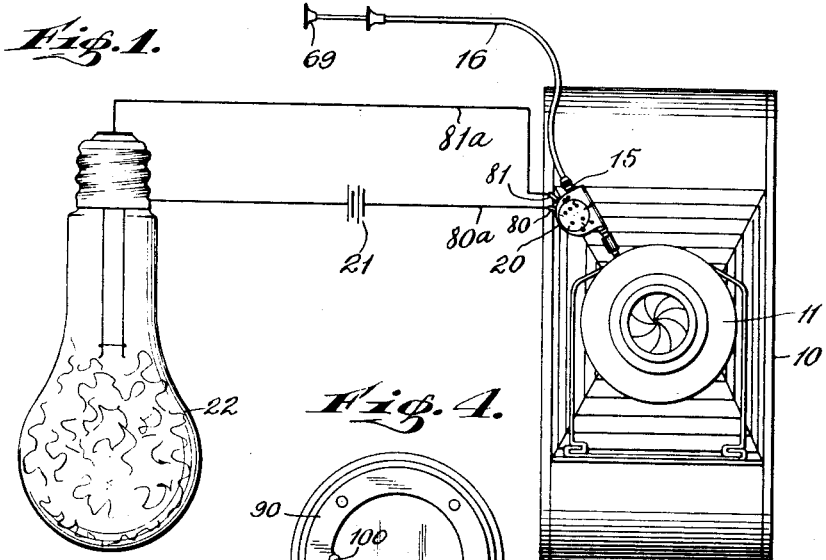
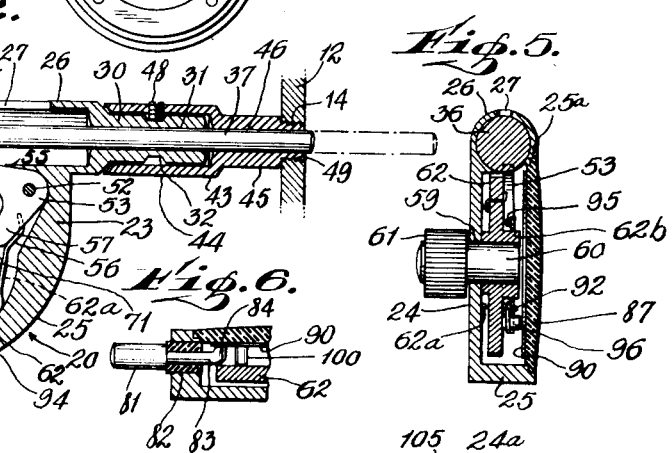
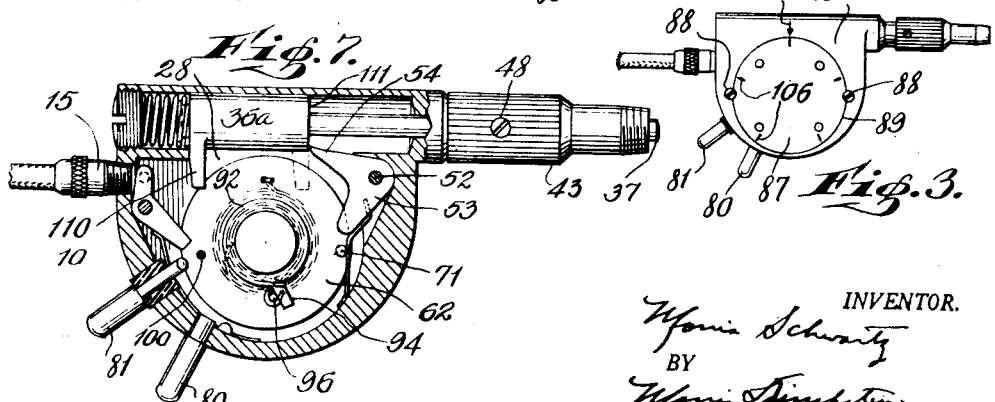
INVENTOR.
Morris Schwartz
BY
ATTORNEY Patented Apr. 2, 1935

1,996,592

UNITED STATES PATENT OFFICE 1,996,592

FLASH LIGHT AND SHUTTER OPERATING DEVICE FOR CAMERAS

Morris Schwartz, Brooklyn, N. Y.

Application August 30, 1932, Serial No. 631,037

24 Claims. (Cl. 67—29)

This invention relates to cameras and accessories therefor. It is particularly directed to a device for operating a camera shutter and closing a switch for completing the circuit for a flash lamp to cause the lamp to burn in predetermined relation to the opening of the camera shutter.

It has been found that flash lamps of the type now in use do not burn with a constant illumination, but have a period of maximum illumination. When using such a flash lamp in conjunction with a camera provided with a shutter which opens for a shorter period than the duration of the burning of the lamp, it becomes essential to open the shutter at the point of maximum illumination. In other words, if a curve was plotted designating intensity of illumination against time of burning, the curve would go up and then down, and it is therefore an object of this invention to provide a device of the character described so constructed that the period during which the shutter is opened may be adjusted to take place at the peak of the curve, whereby a maximum of light is available for taking a flashlight picture.

It is a further object of this invention to provide in a device of the character described, means wherein the timing adjustment may be predetermined accurately without being dependent upon speed of manual movement.

A still further object of this invention is to provide a device of the character described which shall be extremely compact and which may be mounted on the shutter frame without the necessity for turning the entire device, whereby said device may be used with cameras having a relatively small available space.

Still another object of this invention is to provide a neat and rugged device of the character described, which shall comprise comparatively few and simple parts, be inexpensive to manufacture, easy to assemble and mount on or demount from a camera, and which shall be smooth and positive in operation and nevertheless practical and efficient.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a front elevational view of a camera provided with a combination switch and shutter actuation device embodying the invention with the flash lamp and wiring therefor shown diagrammatically;

Fig. 2 is a side elevational cross-sectional view of the device embodying the invention;

Fig. 3 is a side elevational view of said device;

Fig. 4 is an interior view of the cover disc portion of said device;

Fig. 5 is a cross-sectional view taken on line 5—5 of Fig. 2;

Fig. 6 is a cross-sectional view taken on line 6—6 of Fig. 2; and

Fig. 7 is a view similar to Fig. 2 but illustrating a modified construction.

Referring now in detail to the drawing, 10 designates a camera which may be of ordinary construction and provided with a shutter frame 11 containing the usual lens shutter mechanism. The frame 11 is provided with an outer cylindrical wall 12 having a screw threaded opening 14 for receiving the usual screw threaded end 15 of the shutter actuating, flexible plunger 16.

In accordance with my invention, there is mounted on the shutter frame 11 a device 20 embodying the invention, which cooperates with said plunger 16 for actuating the shutter mechanism and also closing an electric circuit 21 for a flash lamp 22.

Said member 20 comprises a casing 23 having a rear wall 24 and a substantially semi-cylindrical wall 25. The front wall 24a of the casing is formed with a circular opening 25a, and said casing is furthermore formed with a substantially diametrically disposed tubular portion 26 forming one side of the casing and having a longitudinal slot 27 on the outer side thereof and an opening 28 on the inner side theerof. Adjacent one end thereof, the tubular portion 26 is formed with an internal screw threaded opening 29 and adjacent the other end thereof said tube is formed with a reduced portion 30 having an axial bore or opening 31 of smaller diameter than the opening within the tubular portion 26. Said reduced portion 30 may be provided with an outer annular groove 32, for the purpose hereinafter appearing.

The cylindrical wall 25 of the casing 23 is formed adjacent the screw threaded end of the tubular portion 26 with a threaded opening 33 similar to the screw threaded opening 14 in the wall 12 of the shutter frame, whereby the screw threaded end 15 of the flexible plunger 16 may be attached within said opening, for the purpose hereinafter described.

Slidably received within the tubular portion 26 is a plunger rod 36 provided with a stem 37 slidably received within the opening 31 in the portion 30. A screw threaded member 40 is screwed to the threaded opening 29 and serves to close one end of the tubular portion 26. A coil compression spring 41 is interposed between the plunger rod 36 and said screw threaded member 40 for normally moving said plunger rod to the right, as shown in Fig. 2 of the drawing.

Mounted on said portion 30 is a sleeve 43 having a skirted portion 44 rotatably receiving said portion 30, and a portion 45 provided with an axial opening 46 rotatably receiving said stem 37. A set screw 48 screwed to said skirted portion 44 projects into said annular groove 32 to permit rotation of said member 42 and preventing longitudinal movement thereof. The end of said portion 45 is threaded, as at 49, to permit said member 43 to be screwed to the screw threaded opening 14 for mounting the device 20 on the shutter frame. It will thus be seen that the member 43 is in the form of a coupling for attaching said member 20 to the shutter frame without necessitating rotation of the casing 23. The coupling 43 alone need be rotated for mounting the device 20 on the shutter frame.

It will now be understood that movement of the plunger 36 to the right under the influence of the compression spring 41 will actuate the shutter mechanism. A pin 50 fixed to said plunger 36 and extending through the longitudinal slot 27, serves to limit movement of said plunger, and further serves as a handle to permit said plunger to be retracted against the pressure of said spring. Means is provided for retaining the plunger in retracted position. To this end, there is pivoted to the casing 23, as for example, on a pin 52 fixed to the casing wall 24, a bell crank lever 53 having a finger or arm 54 projecting through the opening 28 and engaging within a notch or groove 35 in the plunger rod 36. The finger or arm 54 contacts the portion 55 of the tubular wall 26 for retaining said bell crank 53 in plunger engaging position. A spring 56 fixed to the casing in any suitable manner, engages the other arm 57 of the bell crank lever 53 for moving said bell crank into position for engaging the plunger.

Means is provided for releasing the plunger to actuate the shutter mechanism. To this end, the rear wall 24 of the casing 23 is formed with an opening 59 rotatably receiving a shaft 60 projecting into the casing and having fixed thereto a finger nut 61 extending on the outer side of the casing to permit the shaft 60 to be turned. Fixed to said shaft 60 is a disc 62 located within the casing and formed with a hub 62b extending toward the open side of the casing.

The disc 62 may be rotated by means of a spring 62a, disposed between said disc and the wall 24 and attached at one end thereof to the disc and the other end thereof to said wall. Said spring is so arranged as to normally rotate the disc in a clockwise direction, looking at Fig. 2 of the drawing. For retaining the disc against rotation, said disc is provided with a V-shaped notch 63 in the periphery thereof. Pivoted to the rear casing wall 24 as on the pin 64 fixed to said wall, is a bell crank lever 65 having an arm or finger 66 received within said notch 63. Said lever 65 is provided with a second arm or finger 67 overlying the screw threaded opening 33 and adapted to be contacted by the plunger wire 16a within the device 16. Thus upon pressing the handle 69 of the flexible plunger 16, the wire 16a will rotate the bell crank 65 in a clockwise direction for removing the finger 66 from the notch 63 and permitting the disc 62 to be rotated by the spring 62a.

The disc is provided with a transverse finger 71 adapted to contact the finger 57 of the bell crank 53 for rotating the same in a counter-clockwise direction to release the plunger rod 36 for actuating the shutter. A spring 73 fixed within the casing is adapted to press the bell crank lever 65 into position for engaging the notch 63. The disc 62 may be rotated in a counter-clockwise direction, looking at Fig. 2 of the drawing, by manipulating the finger nut or handle 61. Thus the disc may be rotated until the finger 66 again enters the notch 63 for retaining the disc against movement and permitting the spring 56 to again rotate the lever 53 in a clockwise direction so that the finger 54 engages within the notch 35 upon retracting the plunger 36.

Fixed to the cylindrical wall 25 of the casing 24 is a terminal 80 grounded to the casing, and a second terminal 81 insulated therefrom, as at 82, and having a finger 83 extending into the casing and bent toward the open end of the casing, as at 84. Fixed to the terminals 80 and 81 are the wires 80a and 81a forming part of the circuit 21 for the flash lamp 22. The open side of the casing may be closed by an insulating disc 87 rotatably mounted within the circular opening 25a formed in said wall 24a of said casing. A pair of screws 88 screwed to the casing 23 adjacent the circular edge 89, are provided with heads adapted to contact the cover disc for retaining the same in covering position. Loosening of the screws will permit the disc to be rotated within the opening 25 for the purpose hereinafter appearing. Fixed to the inner surface of said disc 87 is a flat, annular, concentric ring 90 made of metal and adapted to be contacted by the bent finger 84 so that the terminal 81 is continuously in electrical contact with said metal ring.

Rotatably mounted on the hub portion 62b of the disc 62 is an annular ring 92 made of metal and having a finger projection 94. A coiled torsion spring 95 extends about the hub 62b and is attached at one end thereof to said projection 94 and at the other end thereof to a pin 96 projecting from the disc 62. The spring 95 is so arranged as to rotate the ring 92 in a clockwise direction, (looking at Fig. 2 of the drawing) for moving the projection 94 against the pin 96.

Upon pressing the handle 69 of the flexible plunger 16 for rotating the bell crank 65 to release the disc, the ring 92 will rotate with the disc until the finger 94 contacts a pin 100 fixed to the annular ring 90 and projecting therefrom toward the disc 62. When the projection 94 contacts said finger 100 the circuit through the terminals 80 and 81 will be completed since the current may pass through the terminal 81 to the finger 83, thence to the ring 90 and through the pin 100 to the projection 94 of the ring 92 which makes electrical contact with the shaft 60, and hence also with the casing 23 to which the terminal 80 is connected.

When the finger 94 contacts the finger 100, the disc will nevertheless continue rotating, and the spring 95 will merely become more tensioned and retain said projection 94 in contact with the finger 100. It will be noted that the disc 62 rotates substantially 360° before the plunger rod 36 is released to actuate the shutter mechanism. However, as illustrated in Fig. 2 of the drawing, the disc need rotate only substantially 90° before the projection 94 contacts the finger 100 for completing the circuit 21 for flashing the lamp 22. Thus the lamp will start burning before the shutter is opened, and the shutter may thus be opened when the illumination caused by burning of the material within the lamp 22 reaches a maximum of intensity.

It will be understood that the timing of the device 20 does not depend upon the speed of any manual movement. Once the disc is released, it will rotate at substantially a uniform rate of speed and the point at which the switch is closed will merely depend upon the position of the finger 100 on cover 87. By rotating the disc 87 which carries the annular ring 90, the position of the finger 100 may be adjusted for changing the timing of the switch closer. By rotating the disc in a clockwise direction, (looking at Fig. 2), the pin 100 will move in a clockwise direction further away from the projection 94, and the switch will then be closed at a shorter period prior to the actuation of the shutter mechanism. Should the pin 100 be moved to substantially the position of the pin 71, the shutter will be actuated simultaneously with the closing of the switch. A mark 105 may be placed on the casing, and the disc 87 may be provided with marks 106 suitably spaced to designate the amount of adjustment made. In other words, the position of the pin 100 with respect to the pin 71 may be determined by the relation of the markings 106 and 105.

It will be noted that the casing is substantially flat and occupies a small space relative to the camera, whereby the device 20 may be applied to most cameras now in use. To mount the device 20 on a camera now in use, it is merely required to first disconnect the usual flexible plunger 16 from the shutter frame, and then screw the coupling 43 to opening 14 and attach the flexible plunger 16 to the casing, as described above.

In Fig. 7 there is shown a modified construction substantially similar to the structure shown in Fig. 2, but provided with a plunger rod 36a having a finger 110 projecting through the opening 28 into the casing. The pin 71 of the disc 62 is adapted to engage the finger 110 upon rotating said disc for retracting the plunger rod. Upon retracting the plunger rod 36a a sufficient distance, the finger 54 will snap into the position shown in Fig. 7 for engaging a shoulder 111 on the plunger rod 36a for retaining the same in retracted position. Thus the disc may be rotated to its normal position, and the plunger rod 36a retracted by a single operation.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawing, is to be interpreted as illustrative and not in a limiting sense.

Having thus described my invention, I claim as new and desire to secure by Letters Patent:

1. In combination with a camera having a shutter frame provided with a screw threaded opening, a switch casing and a member having a pin and groove connection to said casing to permit free rotation of said casing relative to said member and said member having a screw threaded end portion adapted to be screwed to said screw threaded opening in said shutter frame for mounting said casing on said shutter frame.

2. In combination with a camera having a shutter frame, a casing removably mounted on said frame and having a tubular portion, a plunger rod slidably mounted within said tubular portion of said casing and adapted to be moved to shutter actuating position, resilient means for moving said plunger to shutter actuating position, means for holding said plunger out of shutter actuating position, and means for releasing said holding means, said releasing means comprising a disc rotatably mounted within said casing and adapted to engage said holding means.

3. In combination with a camera having a shutter frame, a casing removably mounted on said frame having a tubular portion, a plunger rod slidably mounted within said portion of said casing and adapted to be moved to shutter actuating position, resilient means for moving said plunger to shutter actuating position, means for holding said plunger out of shutter actuating position, and means for releasing said holding means, said releasing means comprising a member rotatably mounted within said casing, means within said casing for rotating said member, means for locking said member against movement, and manual means for releasing said last named locking means.

4. In a device of the character described, in combination, a casing having a tubular portion, a member slidably mounted within said portion of said casing, spring means for moving said member in one direction, a member pivoted to said casing and adapted to engage said member for retaining the same against movement, a disc rotatably mounted in said casing, spring means for rotating said disc, means on said disc for engaging said pivoted member to release said slidably mounted member, a member pivoted within said casing and adapted to engage said disc for retaining the same against movement, and manual means for pivotally moving said last mentioned pivoted member for releasing said disc.

5. In a device of the character described, in combination, a casing, a member slidably mounted therein, spring means for moving said member in one direction, a member pivoted to said casing and adapted to engage said member for retaining the same against movement, a disc rotatably mounted in said casing, spring means for rotating said disc, means on said disc for engaging said pivoted member to release said slidably mounted member, a member pivoted within said casing and adapted to engage said disc for retaining the same against movement, manual means for pivotally moving said last mentioned pivoted member for releasing said disc, a terminal fixed to said casing, and a second terminal fixed to said casing and insulated therefrom, an annular member fixed within said casing and insulated from said casing, said second terminal having a portion contacting said annular member, a member rotatably mounted on said disc and connected thereto by a flexible connection, and having a projection, and a pin on said annular member adapted to contact said projection.

6. In a device of the character described, in combination, a casing, a member slidably mounted therein, spring means for moving said member in one direction, a member pivoted to said casing and adapted to engage said member for retaining the same against movement, a disc rotatably mounted in said casing, spring means for rotating said disc, means on said disc for engaging said pivoted member to release said slidably mounted member, a member pivoted within said casing and adapted to engage said disc for retaining the same against movement, manual means for pivotally moving said last mentioned pivoted member for releasing said disc, a terminal fixed to said casing, and a second terminal fixed to said casing and insulated therefrom, an annular member fixed within said casing and insulated from said casing, said second terminal having a portion contacting said annular member, a member rotatably mounted on said disc and connected thereto by a flexible connection, and having a projection, and a pin on said annular member adapted to contact said projection, said annular member being angularly adjustable with respect to said casing.

7. In combination with a camera having a shutter frame provided with a screw threaded opening and shutter mechanism within said frame, a member screwed within said screw threaded opening, a casing having a pin and groove connection to said member, said member having a through opening, a member slidably mounted within said casing and extending within said through opening, and means for moving said slidably mounted member for actuating said shutter mechanism.

8. In a device of the character described, in combination, a casing having a tubular portion and formed with a chamber, a member slidably movable within said portion, means for moving said member in one direction, a member adapted to engage said first member for retaining the same against movement, a disc rotatably mounted in said chamber, means for rotating said disc, means on said disc for engaging said second member to release said slidably mounted member, a member adapted to engage said disc for retaining the same against movement, and means for moving said last mentioned member for releasing said disc.

9. In a device of the character described, in combination, a casing, a member movable therein, means for moving said member in one direction, a member adapted to engage said first member for retaining the same against movement, a disc rotatably mounted in said casing, means for rotating said disc, means on said disc for engaging said second member to release said first member, a member adapted to engage said disc for retaining the same against movement, means for moving said last mentioned members for releasing said disc, a terminal fixed to said casing, a second terminal fixed to said casing and insulated therefrom, an annular metallic member fixed within said casing and insulated from said casing, said second terminal having a portion contacting said annular member, a member rotatably mounted on said disc and connected thereto by a flexible connection, and having a projection, and a pin on said annular member adapted to contact said projection.

10. In a device of the character described, in combination, a casing, a member movable therein, means for moving said member in one direction, a second member adapted to engage said first member for retaining the same against movement, a disc rotatably mounted in said casing, means for rotating said disc, means on said disc for engaging said second member to release said first member, a member adapted to engage said disc for retaining the same against movement, means for moving said last mentioned member for releasing said disc, a terminal fixed to said casing, a second terminal fixed to said casing and insulated therefrom, an annular metallic member fixed within said casing and insulated from said casing, said second terminal having a portion contacting said annular member, a member rotatably mounted on said disc and connected thereto by a flexible connection, and having a projection, and a pin on said annular member adapted to contact said projection, said annular member being angularly adjustable with respect to said casing.

11. In combination with a camera having a shutter frame and a shutter mechanism within said frame, a casing mounted on said frame, and means within said casing for actuating said shutter mechanism, said means including a disc rotatably mounted within said casing, a terminal fixed to said casing, a second terminal fixed to said casing and insulated therefrom, an annular metallic member fixed within said casing and insulated from said casing, said second terminal having a portion contacting said second member, a member rotatably mounted on said disc and connected thereto by a flexible connection and having a projection, and a pin on said annular member adapted to contact said projection.

12. In combination with a camera having a shutter frame and a shutter mechanism within said frame, a casing mounted on said frame, and means within said casing for actuating said shutter mechanism, said means including a disc rotatably mounted within said casing, a terminal fixed to said casing, a second terminal fixed to said casing and insulated therefrom, an annular metallic member fixed within said casing and insulated from said casing, said second terminal having a portion contacting said second member, a member rotatably mounted on said disc and connected thereto by a flexible connection and having a projection, and a pin on said annular member adapted to contact said projection, said annular member being angularly adjustable with respect to said casing.

13. In combination with a camera having a shutter frame and a shutter mechanism within said frame, a casing mounted on said frame, means within said casing for actuating said shutter mechanism, said means including a member rotatably mounted within said casing, a terminal fixed to said casing, a second terminal fixed to said casing and insulated therefrom, an insulating member mounted on said casing for rotation about the axis of said first rotary member, a metallic strip on said insulating member, said second terminal having a portion contacting said metallic strip, a member rotatably mounted on the axis of said first rotary member and connected thereto by a flexible connection, and having a projection, and a pin on said metallic strip adapted to be contacted by said projection.

14. In combination with a camera having a shutter frame and a shutter mechanism within said frame, a casing mounted on said frame, means within said casing for actuating said shutter mechanism, said means including a member rotatably mounted within said casing, a terminal fixed to said casing, a second terminal fixed to said casing and insulated therefrom, an insulating member mounted on said casing for rotation about the axis of said first rotary member, a metallic strip on said insulating member, said second terminal having a portion contacting said metallic strip, a member rotatably mounted on the axis of said first rotary member and connected thereto by a flexible connection and having a projection, and a pin on said metallic strip adapted to be contacted by said projection, and means for attaching said insulating member to said casing in a plurality of angularly adjusted positions.

15. In a device of the character described, a casing, a plunger movably mounted therein, spring means within the casing projecting the plunger from said casing, a disc rotatably mounted on a wall of said casing and having a shaft extending through said wall, a knob on said shaft for rotating said disc, a member pivoted to said casing and engaging the plunger for retaining the same in retracted position, spring means within the casing for rotating said disc, means on the disc for moving said pivoted member to disengage the same from said plunger and permit said first spring means to project said plunger, a second pivoted member adapted to engage said disc to retain the same against movement, means for moving said last mentioned pivoted member for releasing said disc, one side of said casing being open, a circular insulating member rotatably mounted on the open side of said casing for closing the same and being angularly adjustable, means for fixing said insulating member to said casing in adjusted position, a current carrying member on said insulating member, and current carrying means associated with said disc and adapted to contact the current carrying member on said insulating member.

16. A casing, a plunger slidably mounted therein and adapted to be projected therefrom, spring means for projecting said plunger, means for retaining said plunger in retracted position against the pressure of said spring means, a member rotatably mounted within said casing and having means for moving said retaining means to disengage and release said plunger, said casing having an open side, an insulating disc closing the open side of said casing, a current carrying member on said insulating disc, and means associated with said rotary member adapted to make electrical contact with said current carrying member.

17. A casing, a plunger slidably mounted therein and adapted to be projected therefrom, spring means for projecting said plunger, means for retaining said plunger in retracted position against the pressure of said spring means, a member rotatably mounted within said casing and having means for moving said retaining means to disengage and release said plunger, said casing having an open side, an insulating disc closing the open side of said casing, a current carrying member on said insulating disc, means associated with said rotary member adapted to make electrical contact with said current carrying member, said disc being rotatable about its axis for adjustment, and means for fixing said disc to said casing in adjusted position.

18. A device of the character described, comprising a casing, a plunger slidably mounted within said casing and adapted to be projected therefrom, spring means for projecting said plunger, a disc rotatably mounted on said casing on an axis perpendicular to said plunger, a bell crank pivoted within said casing and having a finger adapted to engage said plunger for retaining the same in retracted position against the pressure of said spring, a pin on said disc adapted to contact said bell crank for moving the same for disengaging the same from the plunger and permit said spring means to project said plunger, spring means for rotating said disc, and means on said disc for retracting said plunger.

19. A device of the character described, comprising a casing, a plunger slidably mounted within said casing and adapted to be projected therefrom, spring means for projecting said plunger, a disc rotatably mounted on said casing on an axis perpendicular to said plunger, a bell crank pivoted within said casing and having a finger adapted to engage said plunger for retaining the same in retracted position against the pressure of said spring, a pin on said disc adapted to contact said bell crank for moving the same to disengage the same from the plunger and permit said spring means to project said plunger, spring means for rotating said disc, and means on said disc for retracting said plunger, a second bell crank within said casing having a finger adapted to engage said disc for retaining the same against rotary movement, and means for rotating said last mentioned bell crank for releasing said disc.

20. A device of the character described, comprising a casing, a plunger slidably mounted within said casing and adapted to be projected therefrom, spring means for projecting said plunger, a disc rotatably mounted on said casing on an axis perpendicular to said plunger, a bell crank pivoted within said casing and having a finger adapted to engage said plunger for retaining the same in retracted position against the pressure of said spring, a pin on said disc adapted to contact said bell crank for moving the same for disengaging the same from the plunger and permit said spring means to project said plunger, spring means for rotating said disc, means on said disc for retracting said plunger, a second bell crank within said casing having a finger adapted to engage said disc for retaining the same against rotary movement, and means for rotating said last mentioned bell crank for releasing said disc, an insulating disc on said casing coaxial with said rotary member, a current carrying member on said insulating disc, means associated with said rotary disc adapted to make electrical contact with said current carrying member.

21. A device of the character described comprising a casing having a pair of flat, parallel side walls of substantially semi-circular shape and a substantially semi-cylindrical wall interconnecting said side walls, and a tubular plunger at one end, one of said flat walls being formed with a bearing opening and the other of said side walls being formed with a circular opening, an insulating disc closing said circular opening and being rotatably adjustable therein, means for fixing said insulating disc in adjusted position, a rotary member within said casing having a shaft projecting through said bearing opening, a knob on said shaft disposed exteriorly of said casing, spring means for rotating said rotary member, a plunger within said tubular portion, spring means within said tubular portion for projecting said plunger from said casing, a bell crank within said casing having a finger engaging said portion to hold the same in retracted position, and a pin on said rotary member adapted to strike said bell crank and move the same to release said plunger.

22. A device of the character described comprising a casing having a pair of flat, parallel side walls of substantially semi-circular shape and a substantially semi-cylindrical wall interconnecting said side walls, and a diametrically disposed tubular plunger at one end, one of said flat walls being formed with a bearing opening and the other of said side walls being formed with a circular opening, an insulating disc closing said circular opening and being rotatably adjustable therein, a rotary member within said casing having a shaft projecting through said bearing opening, a knob on said shaft disposed exteriorly of said casing, spring means for rotating said rotary member, a plunger within said tubular portion, spring means within said tubular portion for projecting said plunger from said casing, a bell crank within said casing having a finger engaging said portion to hold the same in retracted position, and a pin on said rotary member adapted to strike said bell crank and move the same to release said plunger, said disc being formed with a notch, and a second bell crank pivoted within said casing having a finger engaging within said notch to hold said rotary member against rotation.

23. A device of the character described comprising a casing having a pair of flat, parallel side walls of substantially semi-circular shape and a substantially semi-cylindrical wall interconnecting said side walls, and a diametrically disposed tubular plunger at one end, one of said flat walls being formed with a bearing opening and the other of said side walls being formed with a circular opening, an insulating disc closing said circular opening and being rotatably adjustable therein, a rotary member within said casing having a shaft projecting through said bearing opening, a knob on said shaft disposed exteriorly of said casing, spring means for rotating said rotary member, a plunger within said tubular portion, spring means within said tubular portion for projecting said plunger from said casing, a bell crank within said casing having a finger engaging said portion to hold the same in retracted position, and a pin on said rotary member adapted to strike said bell crank and move the same to release said plunger, said disc being formed with a notch, and a second bell crank pivoted within said casing having a finger engaging within said notch to hold said rotary member against rotation, a current carrying member fixed to the inner surface of said insulating disc, and means rotatable with said rotary member adapted to engage said current carrying member.

24. A device of the character described comprising a casing having a pair of flat, parallel side walls of substantially semi-circular shape and a substantially semi-cylindrical wall interconnecting said side walls, and a diametrically disposed tubular plunger at one end, one of said flat walls being formed with a bearing opening and the other of said side walls being formed with a circular opening, an insulating disc closing said circular opening and being rotatably adjustable therein, a rotary member within said casing having a shaft projecting through said bearing opening, a knob on said shaft disposed exteriorly of said casing, spring means for rotating said rotary member, a plunger within said tubular portion, spring means within said tubular portion for projecting said plunger from said casing, a bell crank within said casing having a finger engaging said portion to hold the same in retracted position, and a pin on said rotary member adapted to strike said bell crank and move the same to release said plunger, said disc being formed with a notch, and a second bell crank pivoted within said casing having a finger engaging within said notch to hold said rotary member against rotation, a current carrying member fixed to the inner surface of said insulating disc, means rotatable with said rotary member adapted to engage said current carrying member, and a pair of wires, one connected to said casing, and the other making electrical contact with said current carrying member.

MORRIS SCHWARTZ.